(12) United States Patent
Bryngelson et al.

(10) Patent No.: US 11,204,117 B2
(45) Date of Patent: Dec. 21, 2021

(54) DOCKSIDE SHIP-TO-SHIP TRANSFER OF LNG

(71) Applicant: Excelerate Energy Limited Partnership, The Woodlands, TX (US)

(72) Inventors: Robert Allen Bryngelson, The Woodlands, TX (US); Jonathan W. Cook, Houston, TX (US); Mark K. Lane, Key Largo, FL (US); Edward C. Scott, Conroe, TX (US)

(73) Assignee: Excelerate Energy Limited Partnership, The Woodlands, TX (US)

( * ) Notice: Subject to any disclaimer, the term of this patent is extended or adjusted under 35 U.S.C. 154(b) by 490 days.

(21) Appl. No.: 16/279,945

(22) Filed: Feb. 19, 2019

(65) Prior Publication Data

US 2019/0186663 A1    Jun. 20, 2019

Related U.S. Application Data

(63) Continuation of application No. 15/009,563, filed on Jan. 28, 2016, now Pat. No. 10,247,338, which is a
(Continued)

(51) Int. Cl.
*B63B 27/34* (2006.01)
*B67D 9/02* (2010.01)
(Continued)

(52) U.S. Cl.
CPC ............ *F16L 37/002* (2013.01); *B63B 27/34* (2013.01); *B67D 9/00* (2013.01); *B67D 9/02* (2013.01); *F16L 55/1022* (2013.01); *F17C 13/02* (2013.01); *B65G 67/62* (2013.01); *F17C 2201/052* (2013.01); *F17C 2203/03* (2013.01); *F17C 2205/037* (2013.01); *F17C 2205/0323* (2013.01); *F17C 2205/0326* (2013.01); *F17C 2205/0352* (2013.01); *F17C 2205/0364* (2013.01); *F17C 2221/033* (2013.01); *F17C 2223/0161* (2013.01); *F17C 2223/033* (2013.01); *F17C 2225/0123* (2013.01); *F17C 2225/0161* (2013.01); *F17C 2225/033* (2013.01); *F17C 2225/035* (2013.01); *F17C 2225/036* (2013.01);
(Continued)

(58) Field of Classification Search
CPC ...... F16L 37/002; F16L 55/1022; B67D 9/00; B67D 9/02; F17C 13/02; F17C 2205/0352; F17C 2205/037; B63B 27/34
See application file for complete search history.

(56) References Cited

U.S. PATENT DOCUMENTS

| | | | |
|---|---|---|---|
| 2002/0073619 A1* | 6/2002 | Perkins | B63B 27/24 48/190 |
| 2007/0155260 A1* | 7/2007 | Poldervaart | B63B 22/021 441/5 |
| 2008/0295526 A1* | 12/2008 | Boatman | B63B 27/34 62/50.1 |

* cited by examiner

*Primary Examiner* — Jason K Niesz
(74) *Attorney, Agent, or Firm* — Frederic Dorwart, Lawyers PLLC; Penina Michlin Chiu (57) ABSTRACT

Systems and methods for dockside regasification of liquefied natural gas (LNG) are described herein. The methods include providing LNG from a LNG carrier to a regasification vessel. The LNG may be regasified on the regasification vessel. The regasified natural gas may be discharged with a high pressure arm to a dock and delivered onshore. The regasification vessel may be moored to the dock. The LNG carrier may be moored to the regasification vessel or the dock.

17 Claims, 7 Drawing Sheets

Related U.S. Application Data continuation of application No. 12/760,417, filed on Apr. 14, 2010, now abandoned.

(60) Provisional application No. 61/170,388, filed on Apr. 17, 2009.

(51) Int. Cl.
- *F16L 37/00* (2006.01)
- *F16L 55/10* (2006.01)
- *B67D 9/00* (2010.01)
- *F17C 13/02* (2006.01)
- *B65G 67/62* (2006.01)

(52) U.S. Cl.
CPC ................ *F17C 2227/0135* (2013.01); *F17C 2227/0178* (2013.01); *F17C 2227/0309* (2013.01); *F17C 2227/0311* (2013.01); *F17C 2227/0318* (2013.01); *F17C 2227/0323* (2013.01); *F17C 2227/0393* (2013.01); *F17C 2227/0395* (2013.01); *F17C 2250/032* (2013.01); *F17C 2250/034* (2013.01); *F17C 2250/036* (2013.01); *F17C 2250/0478* (2013.01); *F17C 2250/0482* (2013.01); *F17C 2250/072* (2013.01); *F17C 2260/013* (2013.01); *F17C 2260/04* (2013.01); *F17C 2260/048* (2013.01); *F17C 2265/025* (2013.01); *F17C 2265/031* (2013.01); *F17C 2265/04* (2013.01); *F17C 2265/05* (2013.01); *F17C 2265/068* (2013.01); *F17C 2270/0105* (2013.01); *F17C 2270/0136* (2013.01); *F17C 2270/0581* (2013.01); *Y02T 70/00* (2013.01)

DOCKSIDE SHIP-TO-SHIP TRANSFER OF LNG

CROSS REFERENCE TO RELATED APPLICATIONS

The present application is a continuation of U.S. application Ser. No. 15/009,563 to Bryngelson et al. filed Jan. 28, 2016 and entitled DOCKSIDE SHIP-TO-SHIP TRANSFER OF LNG, which is a continuation of U.S. application Ser. No. 12/760,417 to Bryngelson et al., filed Apr. 14, 2010 and entitled DOCKSIDE SHIP-TO-SHIP TRANSFER OF LNG, which claims the benefit of PCT Application No. PCT/US10/31068 to Bryngelson et al., filed Apr. 14, 2010 and entitled DOCKSIDE SHIP-TO-SHIP TRANSFER OF LNG and also claims the benefit of U.S. Provisional Application No. 61/170,388 to Bryngelson et al., filed Apr. 17, 2009 and entitled CONTINUOUS SHIPBOARD REGASIFICATION OF LNG, which are each hereby incorporated by reference in their entireties.

BACKGROUND OF THE INVENTION

1. Field of the Invention

The invention relates to a system and method of shipboard regasification of liquefied natural gas ("LNG"). Particularly, this system and method relates to dockside ship-to-ship transfer of LNG in connection with the shipboard regasification of LNG.

2. Description of the Related Art

Natural gas is often carried onboard special cryogenic tanker ships from the location of its origin to the location of consumption. In this way, natural gas may be transported to areas with a higher demand for natural gas. Since LNG occupies only about 1/600th of the volume that the same amount of natural gas does in its gaseous state, liquefying the natural gas for transport facilitates the transportation process and improves the economics of the system. LNG is produced in onshore liquefaction plants by cooling natural gas below its boiling point (−259° F. at ambient pressures). The LNG may be stored in cryogenic containers either at or slightly above atmospheric pressure. Typically, the LNG will be regasified prior to its distribution to end users. Regasification may be accomplished by raising the temperature of the LNG at a regasification facility, which may be located onboard a mobile vessel. There are various methods for vaporizing the LNG onboard a vessel. In these methods, heat from at least one heat source, such as seawater, air, or steam from the ship's auxiliary boilers, is transferred to the LNG through heat exchangers which allows the LNG to be vaporized.

Traditionally, a mobile vessel equipped with regasification facilities is loaded with LNG cargoes at the natural gas supply source and travels across the ocean to another location for offloading and distribution. In another example, a vessel with regasification facilities is loaded with LNG cargoes using ship-to-ship (STS) transfer of LNG upstream of the receiving port at a location between the LNG load port and the delivery port. In such an example, a conventional LNG carrier collects the LNG from the natural gas supply source and is used for the long haul transportation. The conventional LNG carrier delivers the cargos from the supply source to the STS transfer location. The regasification vessel is used in shuttle service between the STS transfer location and the offloading port. In these examples, the offloading of natural gas is disturbed since the LNG carrier with regasification facilities must leave the offloading location to receive additional LNG cargoes, which is undesirable.

It has also been proposed that a conventional LNG carrier berth along side a floating platform for the onboard regasification of LNG that is attached to a riser, and the riser is connected to the sea bottom at a location where an underwater pipeline exists. For example, a regasification unit may discharge natural gas to an underwater pipeline using a sub-sea riser and connector such as a turret. However, constructing such a facility is costly and time consuming and locations having underwater pipelines are limited. As a result, such an arrangement is not suitable for many locations in need of a timely natural gas supply at a low cost.

BRIEF SUMMARY OF THE INVENTION

Embodiments described herein generally relate to systems and methods for transferring LNG, regasifying LNG and discharging natural gas onshore.

In some embodiments, a system for vessel regasification of LNG includes a LNG carrier, a dock, a regasification vessel and a high pressure arm. The LNG carrier is moored at the dock and transfers LNG to the dock through a fluid conduit. The regasification vessel receives LNG from the dock through a fluid conduit, and regasifies the LNG into regasified natural gas. The high pressure arm is coupled to the regasification vessel, accepts regasified natural gas from the regasification vessel and is the conduit for the regasified natural gas to pass into a pipeline on the dock.

In some embodiments, a system for vessel regasification of LNG includes a LNG carrier, a regasification vessel, a dock and a high pressure arm. The LNG carrier transfers LNG to the regasification vessel through a fluid conduit. The regasification vessel receives LNG from the LNG carrier through a fluid conduit, and regasifies the LNG into regasified natural gas. The high pressure arm is coupled to the regasification vessel, and it accepts regasified natural gas from the regasification vessel. In some embodiments, the high pressure arm is mounted on the dock.

In some embodiments, a system for vessel regasification of LNG includes a LNG carrier, a regasification vessel, two docks and a high pressure arm. The LNG carrier is moored at a first dock and transfers LNG to the dock through a fluid conduit. The regasification vessel is moored at a second dock, receives LNG from the first dock through a fluid conduit and regasifies the LNG into regasified natural gas. The high pressure arm is coupled to the regasification vessel and a second dock and accepts regasified natural gas from the regasification vessel and is the conduit for the regasified natural gas to pass into a pipeline on the second dock.

In some embodiments, a method for vessel based regasification of LNG includes: transferring LNG from a LNG carrier that is moored at a dock to the dock; transferring the LNG from the dock to a regasification vessel, wherein the regasification vessel regasifies the LNG into regasified natural gas; and discharging the regasified natural gas to a pipeline on the dock.

In some embodiments, a method for vessel regasification of LNG includes: transferring LNG from a LNG carrier to a regasification vessel that is moored at a dock; regasifying the LNG on the regasification vessel; transferring the LNG from the regasification vessel to a dock, wherein the dock is located on one side of the regasification vessel, and the LNG carrier is located on a second side of the regasification vessel; and discharging the regasified natural gas with a high pressure arm.

In some embodiments, a method for vessel regasification of LNG includes: transferring LNG from a LNG carrier that is moored at a first dock to the first dock; transferring the LNG from the first dock to a regasification vessel, wherein the regasification vessel regasifies the LNG into regasified natural gas and discharges the regasified natural gas to a pipeline on a second dock.

In some embodiments, the fluid conduit is rigid piping. In certain embodiments, the fluid conduit is flexible hoses and/or includes a liquid conduit. In some embodiments, the high pressure arm includes one or more joints and/or a quick release system. In certain embodiments, the regasification vessel includes an emergency release coupling. In some embodiments, the emergency release coupling includes a radio communication system and/or a pneumatic actuation system.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

A dockside ship-to-ship transfer of LNG will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

"Coupled" refers to either a direct connection or an indirect connection (e.g., at least one intervening connection) between one or more objects or components. The phrase "directly attached" means a direct connection between objects or components.

"Dock" refers to a structure extending into a sea, lake, river or other navigable body of water.

"Receiving location" refers to any area where natural gas or LNG may be delivered, transported, stored or consumed.

"Waterway" refers to a navigable body of water.

There is a need for methods and systems that allow safe and more efficient delivery of natural gas to markets requiring such an energy supply. It is a goal of this invention to provide a method and system for substantially uninterrupted delivery of natural gas which may reduce the cost of natural gas delivery infrastructures and increases the speed with which such facilities may be constructed. Particularly, it is a goal of this invention to increase the availability of natural gas receiving locations by providing shipboard regasification and storage facilities which are safe and do not require extensive subsea infrastructures, as compared to a subsea buoy or offshore platform delivery system, or large areas of real estate and permits, as compared to land based storage and regasification systems.

Systems and methods for dockside ship-to-ship transfer of LNG, shipboard regasification of LNG and transfer of regasified natural gas are described herein. Using the systems and methods described herein some or all LNG stored on a LNG carrier may be transferred from a LNG carrier to a regasification vessel. In some embodiments, the regasification vessel may be moored at a dock during the LNG transfer. In certain embodiments, both the regasification vessel and the LNG carrier may be moored at a dock during the LNG transfer. Optionally, the LNG travels from the LNG carrier to the regasification vessel across the dock through rigid or flexible piping. At least a portion of all of the LNG may be regasified onboard the regasification vessel and discharged to the dock, for example to a gas pipeline or storage tank on the dock, and then delivered to onshore facilities. In some embodiments, the regasified natural gas may be transferred from the regasification vessel to the dock using a high pressure arm. In such embodiments, a high pressure arm provides a stable and secure means of offloading regasified natural gas to shore. The high pressure arm can handle a range of ship motions, moving with the regasification vessel and compensating for tides and other marine effects. The transfer and regasification of LNG and transfer of natural gas onshore may be done as a continuous or simultaneous process. Such systems and methods allow continuous and uninterrupted delivery of natural gas to downstream customers.

The delivery of natural gas to onshore facilities as described herein requires fewer infrastructures to implement than known methods. For example, subsea buoy delivery systems require docking buoys, subsea flexible risers, subsea manifolds and subsea pipelines that connect to the shore. Likewise, offshore platforms require extensive subsea infrastructures including subsea pipeline systems. Such facilities are difficult to construct under harsh weather conditions or in areas with short construction seasons, and are time consuming and costly to implement. The systems and methods described herein eliminate the need for these extensive subsea or offshore infrastructures, for example, by delivering natural gas into pipelines lying directly on a dock. In some embodiments of the invention, the high pressure arm further allows for an advanced time frame and increased ease of assembly due to modular construction and flexibility in its design for broad applications. In certain embodiments, the high pressure arm may be mounted on the dock and coupled on one end to the regasification vessel and on a second end to a pipeline on the dock. The high pressure arm accommodates ship motions while allowing for efficient delivery of natural gas from the regasification vessel to the pipeline on the dock.

The system and methods described herein have the added advantage of creating many new potential natural gas receiving locations. Instead of requiring costly offshore and/or sub-sea infrastructures, virtually any location with a dock or any location capable of supporting a dock may serve as a receiving location for the delivery of natural gas, in accordance with the systems and methods described herein. As a result, natural gas may be more effectively distributed to markets most in need and may be provided with short term or seasonal service, in addition to baseload deliveries.

In some embodiments, the methods and systems described herein may be brought into operation significantly faster than conventional methods for the regasification of LNG and transfer of regasified natural gas. In certain embodiments, the capital requirements and construction time required to complete the fixed infrastructure of the systems are significantly lower than those of a land-based terminal or a subsea buoy terminal. For example, some embodiments of the systems and methods described herein may be brought into service within about 12 months of site selection and at a cost of approximately 10% of a conventional land-based LNG terminal with the same capabilities. Certain embodiments of the system may replace a conventional land-based terminal in fewer than seven months. Furthermore, systems and methods described herein allow for less time and money to be spent in permitting than land-based terminals and the facilities also require less real estate than land-based terminals.

The systems and methods for transferring LNG and/or delivery of natural gas as described herein are advantageous over conventional methods of transferring LNG and/or delivery of regasified natural gas as the conventional methods may require the regasification vessel to leave the receiving location in order to load LNG cargoes, thereby causing natural gas delivery to be interrupted while the regasification vessel may be on-route, reloading and coming to port. In contrast, the regasification vessel of the present invention may be loaded with LNG cargoes while it may be moored at the dock and/or regasifying and delivering LNG.

Present methods for transferring and regasifying LNG and delivering natural gas do not attempt to perform these functions using vessels moored at a dock. Those of skill in the art presently prefer the ship-to-ship transfer and regasification of LNG to occur miles offshore, for example through the use of subsea buoy systems or offshore platforms, where such operations may be removed from population centers and other ships passing by. Known methods teach away from ship-to-ship transfer of LNG and regasification of LNG at a dock, since if occurring at a dock, the regasification vessel remains at port for extended periods of time. Conventional thinking associates a danger with such an arrangement. However, the methods and systems described herein are unexpectedly safe. Waterway suitability assessments ensure that the extended presence of a regasification vessel at the dock does not present undo risks to the waterway or other vessel traffic in the port. In addition, transit into and out of the port may be studied to ensure the regasification vessel can enter and exit the port safely as well as remain at the dock safely.

Furthermore, in known methods, the onshore or conventional liquid facilities may be off-line for many months if the dock is damaged, for example, in a collision with a ship. However, the methods and systems described herein may be re-implemented quickly if the dock sustains damage. In some embodiments, LNG from at least one LNG storage tank on a LNG carrier may be transferred to a regasification vessel. The LNG carrier and regasification vessel may be coupled to a dock. In some embodiments, the LNG carrier may be coupled to the regasification vessel and the regasification vessel may be coupled to the dock. This arrangement may further reduce docking costs and may also be implemented where there may be a smaller dock or where it may be desirable to dock only one vessel at the dock. The regasification vessel includes at least one regasification system for vaporization of the LNG to form regasified natural gas. The regasified natural gas may be delivered to a pipeline on the dock and transferred to at least one onshore facility, such as a power plant, natural gas grid, or residential or industrial facilities. The LNG may be provided from the LNG carrier to the dock, and then to the regasification vessel, in an uninterrupted flow. Using the systems and methods described herein, LNG may be regasified and transferred to onshore facilities in a continuous manner. In certain embodiments, a high pressure arm may be used to discharge natural gas to the dock, for example into a gas pipeline or storage tank on the dock. In some embodiments, docking the LNG carrier may take two to four hours and the process of transferring over 130,000 m$^3$ of LNG from a LNG carrier, regasifying a portion of the LNG, and then transferring the regasified natural gas onshore may be performed in less than about 12 hours. In certain embodiments, the process of transferring over 130,000 m$^3$ of LNG from a LNG carrier, regasifying a full cargo of LNG and then transferring the regasified natural gas onshore may be performed in less than about 120 hours.

In some embodiments, the transfer of LNG from the LNG carrier to the regasification vessel may be as fast as twice the speed of present methods. In those embodiments, optional hard arms and cryogenic rigid piping, where the piping may be coupled to the LNG carrier and the regasification vessel and lying across the dock of the present invention, allows the vapor recovery system to manage boil-off gas more efficiently and allows for the quicker transfer of LNG cargoes than known methods. The vapor recovery system may be the LNG carrier's boilers or regasification vessel's boilers. For example, the transfer of an entire LNG cargo from an LNG carrier to a regasification facility may take 24 hours if flexible piping is used during the transfer. Flexible piping costs less than rigid piping. The hard arm and rigid piping of the present invention allows for a transfer time of about 12 hours for an LNG cargo of over 130,000 m$^3$ of LNG.

Figure 1:
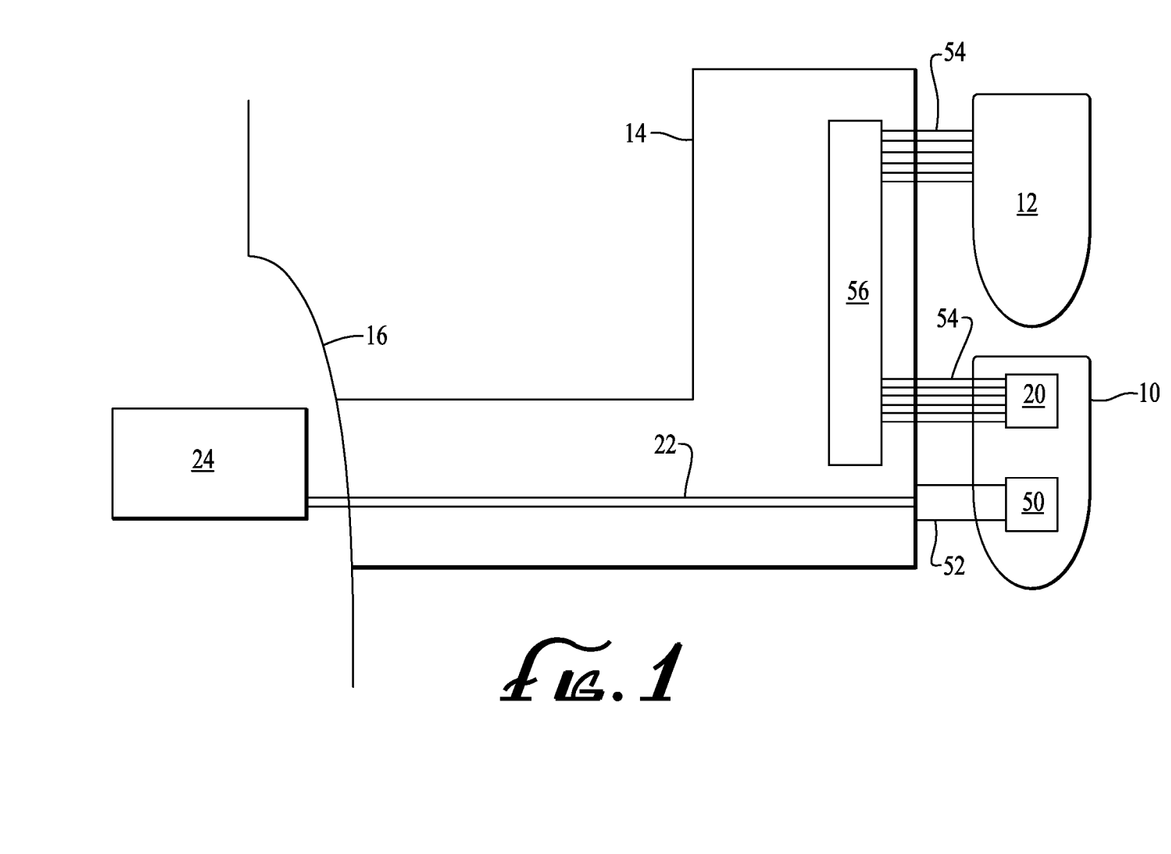
FIG. 1 is a schematic of an embodiment of a system to provide regasified natural gas to onshore facilities that includes a LNG carrier and a regasification vessel.

FIG. 1 depicts a schematic for a system and method for transferring LNG from a LNG carrier to a regasification vessel and providing the regasified natural gas to onshore facilities. Regasification vessel 10 and/or LNG carrier 12 may be coupled to dock 14. Coupling of regasification vessel 10 and/or LNG carrier 12 to dock 14 may be done using known methods for mooring the regasification vessel and/or LNG carrier to dock 14. For example, regasification vessel 10 and/or LNG carrier 12 may be fastened using ropes, mooring lines, hawsers, fenders, anchors, and/or buoys. Additional safety features may also be included in the mooring systems so that regasification vessel 10 and/or LNG carrier 12 may be safely moored at the dock. For example, the mooring system may include mooring line hooks with load sensors, automated mooring strain gauge systems with alarms, remote release capabilities and/or quick release capabilities. In addition, provisions for tug boat assistance during mooring and timely access to tugs during periods of bad weather may be incorporated and improve the safety of the mooring system. Recommendations from Hazard Operability Studies (HAZOP) and Hazard Identification (HAZID) risk assessments may also be included in the mooring systems. As shown in FIG. 1, dock 14 may be coupled to shore 16.

Dock 14 may extend any distance from shore 16 that allows regasification vessel 10 to proceed to the dock, lay alongside the dock, and depart from the dock, while always staying afloat. Dock 14 may be reinforced with concrete and bridge decking to accommodate the regasification and delivery of natural gas. Shorter distances from the shoreline to the end of the dock allow minimization of the length of piping needed to transfer the natural gas to shore, such as the length of gas pipeline 22. Dock 14 may be in a protected area of the shoreline. Docking of the vessels in a protected area may allow transfer of LNG, regasification of LNG, and subsequent transfer of regasified natural gas to be carried out in non-ideal weather conditions. For example, water (seas) near the dock may be calmer than water (seas) one or two miles offshore of the dock.

Regasification vessel 10 may be capable of travelling short or long distances under its own power, and may utilize a steam propulsion plant, diesel engine, diesel electric engine, gas turbine propulsion plant, or any other ship propulsion system known to those of skill in the art. U.S. Pat. No. 7,484,371 to Nierenberg and U.S. Pat. No. 7,219,502 to Nierenberg, the contents of which are hereby incorporated by reference in their entirety, discloses an LNG carrier with a suitable propulsion plant and shipboard regasification system.

In some embodiments, regasification vessel 10 may be an LNG tanker that incorporates onboard equipment for the vaporization of LNG and delivery of high pressure natural gas. In certain embodiments, regasification vessel 10 may be a conventional LNG carrier that has been modified to include equipment for the vaporization of LNG and delivery of high pressure natural gas. Regasification vessel 10 may include specialized equipment to accomplish offshore vaporization of LNG. In some embodiments, regasification vessel 10 may be equipped with emission control equipment to reduce the amount of nitrogen oxide and carbon monoxide emissions from power equipment onboard the ship. In certain embodiments, emission reductions may be achieved through a selective catalytic reduction system that reacts with the exhaust gases of regasification vessel 10. Such a system reduces pollutants by 95% as compared to conventional vessels.

In some embodiments, regasification vessel 10 includes an initial cargo of LNG, which has been loaded onto storage tanks on the regasification vessel in the same manner as standard LNG tankers. The loading may take place at any traditional natural gas liquefaction terminal.

In some embodiments, LNG may be transferred from LNG carrier 12 to at least one storage tank located on regasification vessel 10 via dock manifold 56 and ship manifold 20. In other embodiments, LNG may be transferred from LNG carrier 12 directly to the regasification system on regasification vessel 10 via dock manifold 56 and ship manifold 20. Ship manifold 20 may be a standard configuration well known to those of skill in the art. Dock manifold 56 may be flexible or rigid cryogenic transfer piping or hoses.

In certain embodiments, dock manifold 56 may be an LNG storage tank. The LNG storage tank may be on dock 14 or shore 16. LNG carrier 12 may dock at dock 14, transfer LNG to dock manifold 56, and then depart from dock 14. The regasification vessel 10 may then dock and load the LNG from dock manifold 56, regasify the LNG and discharge the regasified natural gas into gas pipeline 22. Gas pipeline 22 may be connected to onshore facilities 24 or a pipeline distribution system.

Liquid connections 54 may be a fluid conduit and may couple dock manifold 56 and ship manifold 20. Liquid connections 54 may be flexible or rigid cryogenic piping or hoses and/or a liquid LNG arm. In some embodiments, rigid piping may be used to allow for a higher rate of LNG transfer between LNG carrier 12 and regasification vessel 10. Such a configuration provides the vapor recovery system a greater ability to manage the boil-off gas generated during the transfer operation.

In an embodiment, regasification vessel 10 receives its initial cargo of LNG and also subsequent LNG cargoes from LNG carrier 12, while LNG carrier 12 may be docked at dock 14. The LNG from LNG carrier 12 may be delivered directly into the regasification system of regasification vessel 10 or it may be delivered into at least one cryogenic LNG storage tanks on regasification vessel 10, and then subsequently transferred to a regasification system onboard regasification vessel 10 using methods well known to those of skill in the art.

In some embodiments LNG carrier 12 may be a standard LNG carrier, an ocean going vessel that may be used for the transportation of LNG from one location to another, which is well known to those of skill in the art. LNG carrier 12 may also be a regasification vessel or any other floating method of conveyance for LNG, such as a barge. LNG carrier 12 may be double hulled and include at least one insulated cryogenic storage tank, which may store LNG at about −162° C. Pressure in the storage tank(s) may be kept constant by allowing boil off gas to escape from the storage tank. Gaztransport & Technigaz SA of Saint-Rémy-les-Chevreuse, France supplies specially reinforced No. 96 type membrane tanks which are suitable. SPB prismatic tanks supplied by IHI Corporation of Tokyo, Japan, Moss Spherical tanks supplied by Moss Maritime AS of Lysaker, Norway and GTT MKIII tanks supplied by Gaztransport & Technigaz SA of Saint-Rémy-les-Chevreuse, France are also suitable storage tanks. Such storage tanks may also be included on regasification vessel 10.

Table 1 sets forth non-limiting features of embodiments of regasification vessel 10 and LNG carrier 12. Other types, models and sizes of regasification vessel 10 and LNG carrier 12 are also contemplated.

TABLE 1

| Vessel Type | LNG Carrier | Regasification Vessels | |
|---|---|---|---|
| Capacity (m³) | 138,000 | 138,000 | 150,900 |
| Containment System | No. 96 | No. 96 | No. 96 |
| Length (m) | 277.0 | 277.0 | 291.0 |
| Beam (m) | 43.40 | 43.40 | 43.40 |
| Laden Draft (m) [.478 sp gr] | 11.42 | 11.52 | 11.94 |
| Scantling Draft (m) [.50 sp gr] | 12.24 | 12.32 | 12.42 |
| Ballast Draft (m) | 9.40 | 9.50 | 9.50 |
| Air Draft in Ballast (m) | 44.8 | 44.7 | 44.7 |
| Deadweight Tons at Scantling Draft | Approx. 93,786 | Approx. 77,287 | Approx. 83,301 |
| Gross Tons | Approx. 93,786 | Approx. 93,719 | Approx. 100,311 |
| Service Speed at 90% MCR | 19.5 | 19.2 | 19.2 |
| Fuel Consumption (mt/d) | 168 | 174 | 176 |
| Boil-Off Rate/Day | 0.150% | 0.155% | 0.155% |
| Cargo Capacity 98.5% (m³) | Approx. 135,963 | Approx. 135,930 | Approx. 148,716 |
| Cool Down Volume (m³) | 800 | 800 | 880 |
| Cool Down Time (hrs) | 10 | 10 | 10 |

Various arrangements of fluid conduits such as piping, hard arms, hoses, rigid connections and/or flexible connections may be used to transfer LNG between the LNG carrier and the regasification vessel, between the LNG Carrier and the dock and/or between the dock and the regasification vessel. In some embodiments, the LNG carrier may contain distribution lines coupled to at least one cryogenic storage tank and to liquid LNG hard arms used for loading and/or unloading LNG, and LNG from the LNG carrier may be offloaded through the distribution lines and supplied to the regasification vessel. A pump(s) may be employed during the process of supplying LNG from the LNG carrier to the regasification vessel and/or, in certain embodiments, during the process of supplying LNG from one or more storage tanks on the regasification vessel to the regasification system on regasification vessel 10.

LNG may be vaporized on regasification vessel 10 using methods known in the art for onboard vaporization of LNG. Examples of suitable systems for regasification of LNG are described in U.S. Pat. No. 7,484,371 to Nierenberg; U.S. Pat. No. 7,293,600 to Nierenberg; U.S. Pat. No. 7,219,502 to Nierenberg; U.S. Pat. No. 6,688,114 to Nierenberg; and U.S. Pat. No. 6,598,408 to Nierenberg, which are herein incorporated by reference in their entirety.

In an embodiment, heat from at least one heat source may be transferred to the LNG through heat exchangers (e.g., shell and tube heat exchangers and/or printed circuit heat exchangers), which allows for regasification of the LNG. In certain embodiments, regasification vessel 10 includes high pressure cryogenic pumps to bring the LNG from at least one cargo tank up to high pressure prior to vaporization, vaporizers to convert the LNG back to gaseous natural gas, oversized boilers to provide power and sustain the vessel operations along with the shipboard regasification process, and reinforced LNG cargo tanks and internal pump towers designed to withstand sloshing loads encountered through all loading levels.

As shown in FIG. 1, regasified natural gas may be transferred onshore from regasification vessel 10 via natural gas manifold 50. In some embodiments, natural gas manifold 50 may be a mid-ship high pressure gas manifold. In some embodiments, natural gas manifold 50 may be located forward of ship manifold 20, but other locations are contemplated. Natural gas manifold 50 allows direct discharge of natural gas from regasification vessel 10 to gas conduit 52. Gas conduit 52 allows loading and unloading of high pressure natural gas from regasification vessel 10. Gas conduit 52 may accommodate a range of motions to prevent damage if regasification vessel 10 moves while alongside dock 14 and may be mounted on dock 14 or mounted on regasification vessel 10. In some embodiments, gas conduit 52 may be connected directly to gas pipeline 22 on dock 14, to shore 16 or to shore-based storage tank 24.

In some embodiments, gas conduit 52 may be flexible or rigid piping and/or hoses suitable for gaseous natural gas transfer from regasification vessel 10 to dock 14. In certain embodiments, gas conduit 52 may be a high pressure arm, for example high pressure arm 300 shown in FIG. 2.

Gas conduit 52, dock 14 and/or regasificaton vessel 10 may include one or more systems to provide for quick release of gas conduit 52 from regasification vessel 10, dock 14, shore 16 or another platform or vessel. FIG. 3 depicts a schematic of an embodiment of a system to initiate quick release of a gas conduit. To improve safety, gas conduit 52 may be equipped with an alarm set point to warn of an excursion of regasification vessel 10 along dock 14. In certain embodiments, dock 14 may be a dock, berth, barge, liquefaction vessel, LNG carrier, the shore, or any other marine vessel or structure. Regasification vessel 10 and/or conduit 52 may also be equipped with manual or automated quick release capabilities, such as quick release system 340 shown in FIG. 2, to close valves on gas conduit 52, for example valves 410, and decouple gas conduit 52 from regasification vessel 10 if regasification vessel 10 moves past the alarm set points. In some embodiments a hydraulic system may be used to trigger a separation in such an emergency. In certain embodiments, physical connections, radio, laser or ultrasonic transponders may be used to measure the distance between a sending location (for example, regasification vessel 10) and a receiving location (for example, dock 14) and thereby detect abnormal motion between them.

As shown in FIG. 3, transponders 80 may be battery powered and/or attached to regasification vessel 10 and/or dock 14 using heavy duty magnets, vacuum suction cups or some other attachment mechanism that can withstand seawater, wind, cold or other extreme conditions. Backup battery 88 may also be included. In some embodiments, multiple pairs of transponders that implement a voting system may be used to determine whether there has been abnormal movement of the ship. In some embodiments, fender 87 may also assist in keeping regasification vessel 10 within normal parameters. As shown in FIG. 3, in some embodiments, transponders 80 send information to computer 82 onboard regasification vessel 10 or to a programmable logic controller ("PLC") on a portable or fixed control console using low power radio transmitter 83. Computer 82 or a PLC may then analyze the data from the transponders, including the distance between hulls, rate of change, degree of rolling and pitching to determine whether abnormal motion is occurring, and trigger an audible and/or visual alarm in a control room, on a control console and/or on the open decks of regasification vessel 10, for example alarm 86, when it receives the appropriate input. Computer 82 may communicate with alarm 86 using a wireless or wired connection. In some embodiments, the computer or PLC may be programmed to understand the parameters for normal movement of a ship and unacceptable deviation from those parameters. In some embodiments, computer 82 may determine that a distance between hulls has deviated from one or more preset parameters for a preset duration of time. Transponders 80 and other equipment in the field or on deck of regasification vessel 10 used for detection and triggering of a need for emergency shutdown and decoupling of gas conduit 52 described herein are significantly safer than conventional methods. Conventional methods require mechanical and/or hydraulic connections which are unwieldy and can present safety and/or environmental hazards.

Figure 2:
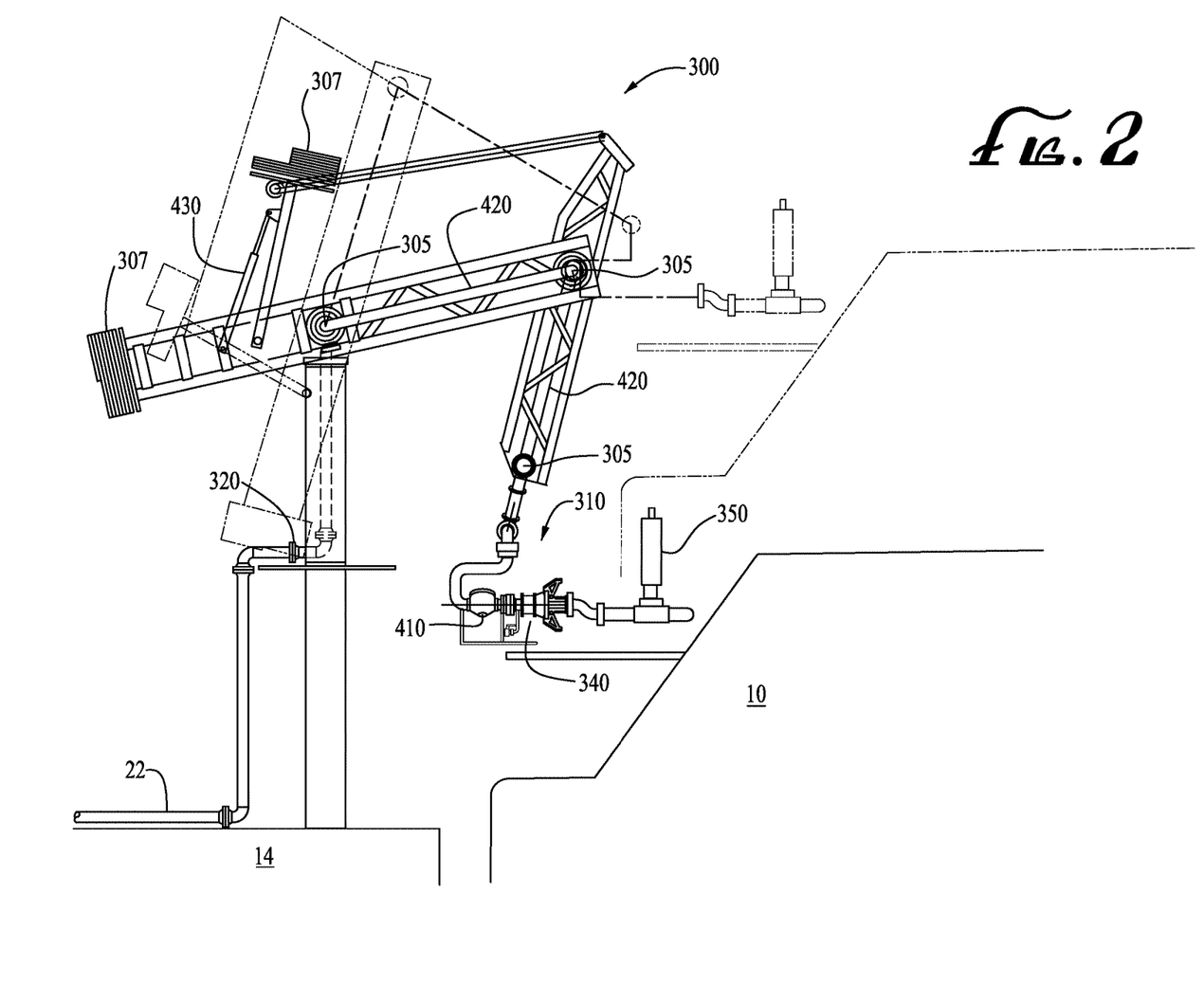
FIG. 2 is a schematic of an embodiment of a high pressure arm.
Figure 3:
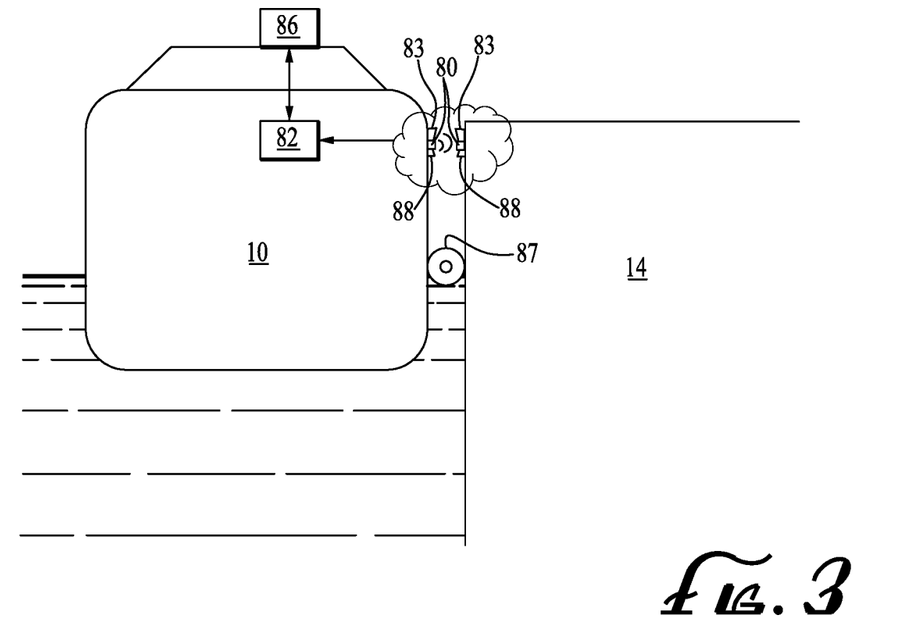
FIG. 3 is a schematic of an embodiment of a system to initiate quick release of a gas conduit.
Figure 4:
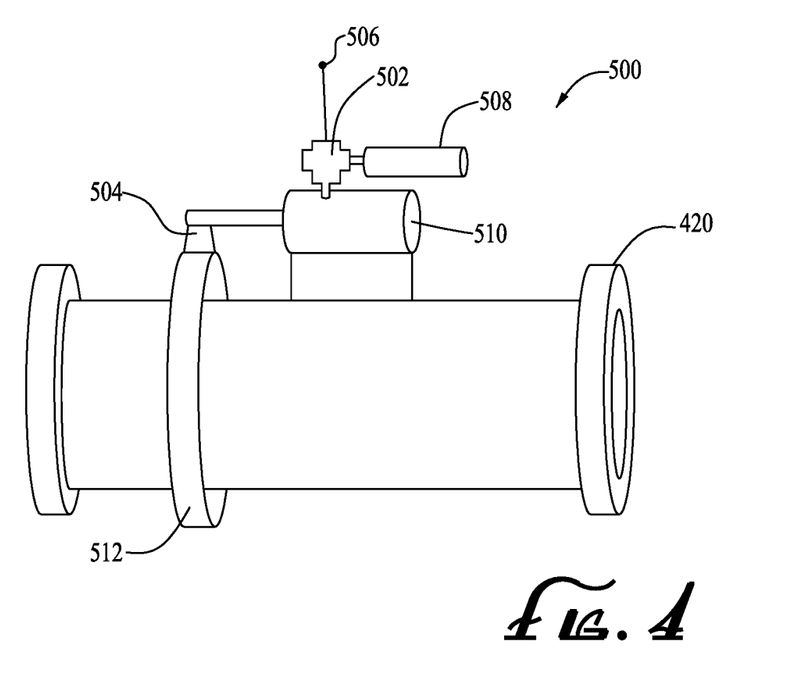
FIG. 4 is a schematic of an embodiment of a system to provide a radio communication and pneumatic actuation system to trigger emergency shut down and emergency release couplings.

In some embodiments, as shown in FIG. 2, emergency release coupling ("ERC") 350 on regasification vessel 10 and/or conduit 52 may be used alone or in conjunction with emergency shutdown and quick release connections on gas conduit 52, which may be shut down valves 410 and quick release system 340 described herein. In some embodiments, a physical or hydraulic system may be used on the deck of regasification vessel 10 for this purpose. In certain embodiments, radio communication and pneumatic actuation systems may be used on emergency shut down and ERC 350 on the deck of regasification vessel 10. FIG. 4 depicts a schematic of an embodiment of a system to provide radio communication and pneumatic actuation systems to trigger emergency shut down and emergency release couplings on the deck of a regasification vessel. When audible and/or visual alarm 86 is activated, an operator (if present) can choose to send one or more radio signals or other type of signal to one or more dry break ERC actuators, such as dry break actuator 500, which may be attached to the manifold, for example on ERC 350. The signal may be sent by a computer in a control room, such as computer 82, or on a fixed or portable control cart. One or more radio frequencies may be used to trigger one or more dry break ERC actuators individually, consecutively or simultaneously, as needed. Dry break ERC actuator 500 receives the signal with receiver 502 and may use a stored-pressure pneumatic system to trigger the release of ERC 500 between regasification vessel 10 and dock 14. If an operator is not present, then the system may be programmed to automatically signal the emergency shut down and/or dry break ERC actuator 500 to release if alarm 86 remains activated for a predetermined amount of time, for example 20 seconds, 30 seconds or one minute. The release process may occur in two steps. First, cargo transfer may be shut down. Second, if the alarm continues, there may be a second signal to trigger ERC 350 and/or quick release system 340 on each hose, pipe, high pressure arm and/or gas conduit. Receiver 502 may require receipt of multiple signals from the PLC or computer 82 before triggering release, in order to first confirm that cargo transfer is shut down prior to initiating the release on the couplings. Alternatively, the communication equipment attached to dry break ERC actuator 500 may engage in two way communications with the PLC or computer 82. The radio communication and pneumatic actuation method and system described herein increases the safety as compared to conventional methods.

As shown in FIG. 4, once receiver 502 obtains a signal to commence a release on coupling 504, receiver 502 with antenna 506, punctures attached compressed nitrogen gas cylinder 508. Receiver 502 may also include a solenoid valve and blowdown. In this embodiment, the change in pressure causes pneumatic cylinder 510 with a piston to move and coupling 504 to open, disconnecting from ERC collar 512 and allowing separation of the connections between regasification vessel 10 and dock 14, for example transfer piping 420 or gas conduit 52. The quick release/ emergency release system described herein may also be used in connection with rigid or flexible piping, hoses, loading/ unloading gas arms, high pressure arms, and/or liquid arms between two vessels, between a LNG carrier and a dock, or between any vessels, vehicles or structures used for cargo transfers such as transfers of high pressure gas or LNG.

In some embodiments, gas conduit 52 may be a rigid loading/unloading gas arm. For example, gas conduit 52 may be a high pressure arm. The Emco Wheaton Division of the Engineered Products Group of Gardner Denver, Inc. of Quincy Ill. supplies a suitable high pressure arm designed to handle the high pressure natural gas that may be discharged from regasification vessel 10.

A high pressure arm may have custom built features that vary depending on the particular system in which it may be used. FIG. 2 depicts one embodiment of a high pressure arm. High pressure arm 300 may be rigidly, flexibly or rotationally mounted on dock 14. In some embodiments, high pressure arm 300 may be mounted on regasification vessel 10. High pressure arm 300 may be suitable for gaseous natural gas transfer and may be rotationally coupled on first end 310 to regasification vessel 10 and rotationally coupled on second end 320 to dock pipeline 330. In some embodiments, high pressure arm 300 comprises transfer piping 420 and shut down valves 410. Transfer piping 420 may be rigid piping, flexible piping or hoses. High pressure arm 300 may be configured to rotate on its axis and all dimensions, by swiveling, moving up and down and moving in and out in response to wind and wave forces acting upon regasification vessel 10. High pressure arm 300 may contain multiple joints 305, dampener 430 and counterweights 307 to allow movement and/or articulation of high pressure arm 300.

As shown in FIG. 2, first end 310 of high pressure arm 300 may include quick release system 340. If the motion of high pressure arm 300 exceeds one or more preset parameters in any direction, quick release system 340 causes shut down valves 410 at first end 310 to rapidly close and quick release system 340 to release. Also shown in FIG. 2, regasification vessel 10 may include ERC 350, which may be located on deck next to first end 310. ERC 350 actuates in response to ship motion outside one or more preset parameters, for example, by using the hydraulic or pneumatic release systems described herein. ERC 350 may operate automatically or communicate with regasification vessel 10, high pressure arm 300 and/or an operator, PLC and/or computer on regasification vessel 10 or dock 14 using mechanical, electronic, audio or visual communication methods described herein. This emergency procedure allows immediate decoupling of high pressure arm 300 from regasification vessel 10 by shutting off the flow of gas between regasification vessel 10 and dock 14 and physically detaching high pressure arm 300 from regasification vessel 10. High pressure arm 300 may automatically move away from the ship when quick release system 340 may be activated, as shown in the alternative view in FIG. 2. A floating fender may be attached to dock 14 to protect regasification vessel 10 from collisions with dock 14.

Figure 5:
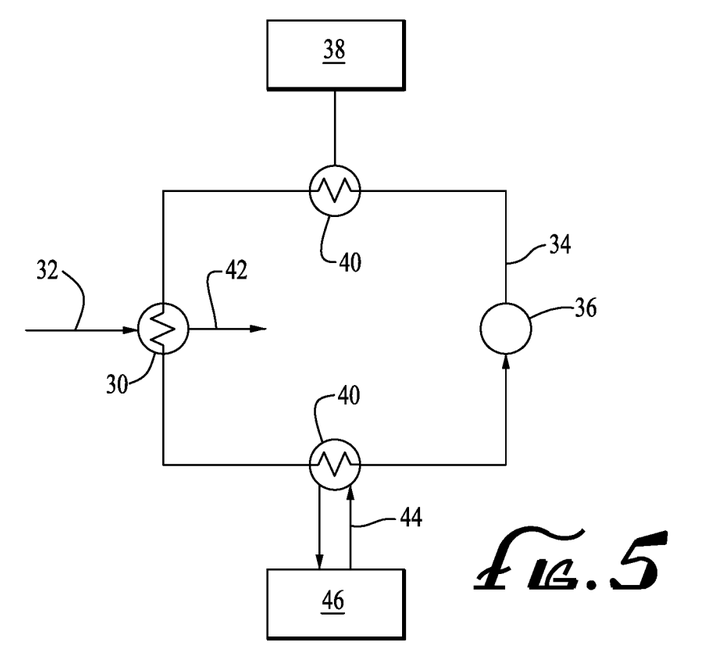
FIG. 5 is a schematic of an embodiment of a closed-loop regasification system.

In some embodiments, regasification vessel 10 may include a closed-loop regasification system. Use of a closed-loop system may allow minimal usage of seawater by regasification vessel 10 in one or more embodiments of the system.

FIG. 5 depicts a closed-loop regasification system. At least a portion of the LNG transferred from LNG carrier 12 to regasification vessel 10 enters vaporizer 30 via vaporizer conduit 32. In some embodiments, all of the LNG transferred to the regasification vessel may be regasified in vaporizer 30. The transfer and regasification of the LNG may be done as a continuous process.

Vaporizer 30 includes, but is not limited to, shell-and-tube heat exchangers, open rack vaporizers, submerged combustion vaporizers, ambient air heated vaporizers, and combined heat and power units. Vaporizer 30 may be coupled to piping 34. Fluid may be circulated through piping 34 using pump 36 in a closed-loop mode or system. Fluid in piping 34 may be heated by exchanging heat with fluid from boilers 38 using heat exchangers 40. Fluid in piping 34 includes, but may be not limited to, water, glycol, a glycol water mixture, or propane. In some embodiments, the fluid in piping 34 may be the same as the fluid heated by boilers 38 and provided to heat exchangers 40. In some embodiments, the fluid heated by boilers 38 may be mixed with another fluid circulating in piping 34 through heat exchangers 40. The heated fluid or fluid mixture circulates through vaporizer 30 and heats the LNG sufficiently to regasify the LNG. The regasified natural gas exits vaporizer 30 via exit conduit 42. Exit conduit 42 may be connected to an onboard manifold and/or piping suitable to transfer the natural gas onshore as described herein. In certain embodiments, additional heat may be provided to heat exchangers 40 and/or piping 34 from central cooling system 44 connected to energy system 46. In some embodiments, additional heat from central cooling system 44 may be not necessary. Energy system 46 may include, but may be not limited to, one or more turbines, electrical heaters and/or diesel engines.

In some embodiments, an open-loop mode may be used to regasify the LNG. In an open-loop mode, sea water may be drawn in through sea chests onboard regasification vessel 10. The seawater may be used as a heat source and passed through the tubes of shell-and-tube vaporizers.

In some embodiments, a combination of a closed-loop mode and open-loop mode of operation ("combined mode") may be used to regasify the LNG. In a combined mode, seawater at temperatures between 45 and 58° F. may be used as a heat source and further heat may be introduced using steam from boilers 38 on regasification vessel 10, or some other additional heat source or sources, to provide sufficient heat for the vaporization of the LNG.

Equipment located on or near dock 14 may be connected to gas conduit 52 and provide pressure control and/or flow control during the transfer of regasified natural gas from natural gas manifold 50 to gas conduit 52. In some embodiments, nitrogen may be blended with the regasified natural gas in above-ground facilities. For example, the facilities may provide delivery of natural gas containing up to 5 percent by volume nitrogen. On-site nitrogen blending facilities allow natural gas of virtually any specification to be delivered.

Once the LNG has been vaporized, it may be discharged through gas conduit 52 to gas pipeline 22. Gas pipeline 22 may be on dock 14. Direct transfer from regasification vessel 10 to gas pipeline 22 allows direct access to onshore facility 24 shown in FIG. 1. Onshore facilities include, but are not limited to, residential and industrial facilities, a natural gas grid, power plant or another natural gas distribution facility. A high-pressure gas pipeline link may be used to connect into existing natural gas transmission systems. In one embodiment, onshore facility 24 may handle peak imports of up to about 600 mmcf/d of natural gas.

Figure 6A:
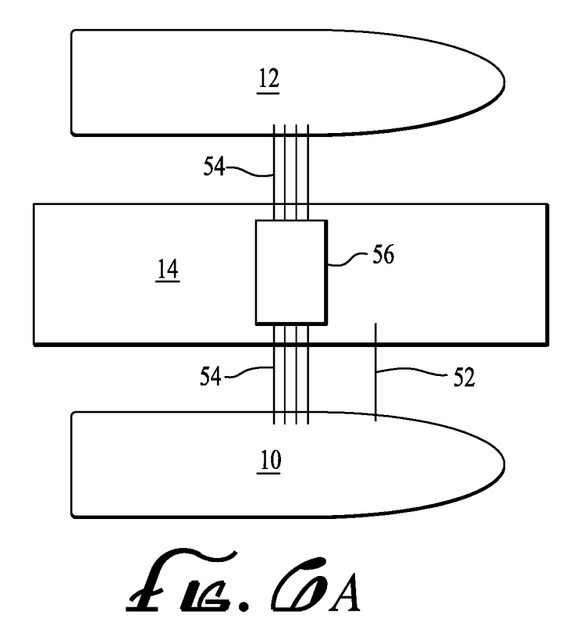
FIG. 6A is a schematic of an embodiment of a system to provide regasified natural gas to onshore facilities that includes a LNG carrier located on a first side of a dock and a regasification vessel located on a second side of the dock.
Figure 6B:
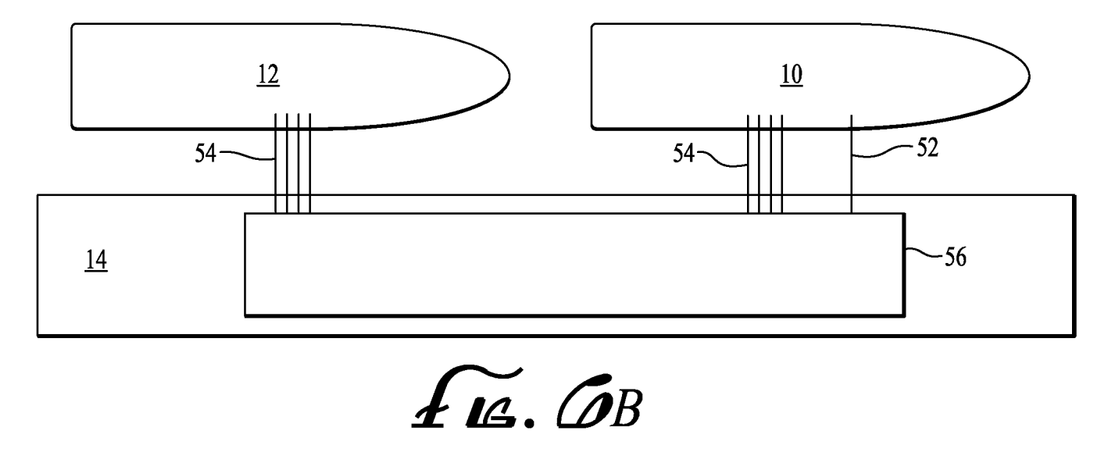
FIG. 6B is a schematic of an embodiment of a system to provide regasified natural gas to onshore facilities that includes an LNG carrier vessel and a regasification vessel located on the same side of the dock.
Figure 6C:
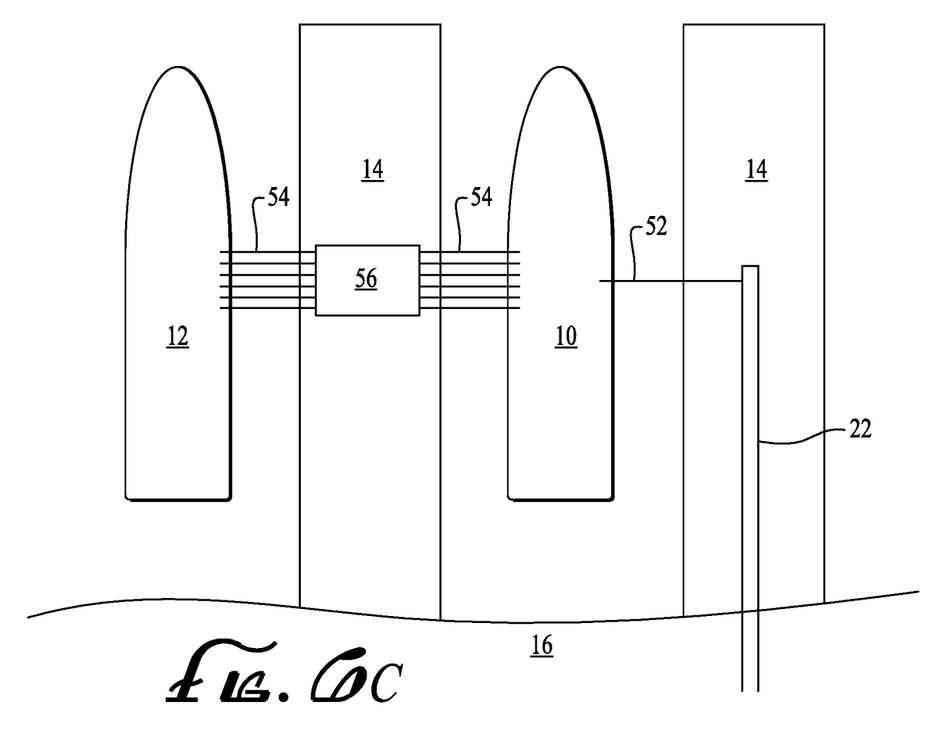
FIG. 6C is a schematic of an embodiment of a system to provide regasified natural gas to onshore facilities that includes an LNG carrier located proximate to a first dock and a regasification vessel located proximate to a second dock.

FIGS. 6A, 6B and 6C depict schematics of embodiments of systems to provide continuous regasification of LNG. FIG. 6A is a schematic of an embodiment of a system to provide regasified natural gas to onshore facilities that includes a LNG carrier located on a first side of a dock and a regasification vessel located on a second side of the dock. FIG. 6B is a schematic of an embodiment of system to provide regasified natural gas to onshore facilities that includes an LNG carrier and a regasification vessel located on the same side of the dock. FIG. 6C is a schematic of an embodiment of a system to provide regasified natural gas to onshore facilities that includes an LNG carrier located proximate to a first dock and a regasification vessel located proximate to a second dock.

As shown in FIG. 6A, LNG carrier 12 couples to a first side of dock 14 and regasification vessel 10 couples to a second side of dock 14. As shown in FIG. 6B, LNG carrier 12 and regasification vessel 10 are coupled to the same side of dock 14. As shown in FIG. 6C, LNG carrier 12 is coupled to a first dock 14 and regasification vessel 10 is coupled to a second dock 14, which may be adjacent to first dock 14. LNG may be transferred from LNG carrier 12 to regasification vessel 10 via liquid connections 54 and dock manifold 56, which may include emergency shutdown, shut down valves 410, quick release system 340, ERC 350 and/or other emergency release system(s). Dock manifold 56 includes, but may be not limited to, flexible or rigid cryogenic transfer piping. Rigid piping may allow for LNG unloading at twice the speed of flexible piping. Dock manifold 56 may be positioned on or connected to dock 14. In some embodiments, liquid connections 54 and dock manifold 56 form a single conduit. For example, liquid connections 54 and dock manifold 56 form a contiguous pipe or hose. In certain embodiments, dock manifold 56 may be a manifold for transporting LNG. In some embodiments, liquid connections 54 may be liquid LNG hard arms. Liquid LNG hard arms may be similar to high pressure arm 300 described herein. However, liquid LNG hard arms are configured to transfer liquid cryogenic natural gas rather than high pressure gaseous natural gas. Liquid connections 54 and dock manifold 56 allow for uninterrupted baseload flow of liquefied natural gas. Using the described above-ground ship-to-dock or dock-to-ship transfer system may facilitate handling of boil-off gas. In some embodiments, dock manifold 56 may be rigid piping and liquid connections 54 may be rigid connections, such as hard arms. In some embodiments, hard arms may provide a superior ability to manage the boil-off gas generated during transfer operations.

Onboard regasification vessel 10, LNG may be regasified as described herein. The regasified natural gas may then be transferred to dock 14 via gas conduit 52. For example, the regasified natural gas may be transferred via high pressure arm 300 to gas pipeline 22 on dock 14. Gas conduit 52 may be coupled to onshore facilities as described for FIG. 1.

As described herein, both the LNG carrier 12 and regasification vessel 10 may be moored at one or more docks, for example as shown in FIGS. 6A, 6B and 6C. Alternatively, in some embodiments, a LNG carrier may be positioned on one side of a regasification vessel and the regasification vessel may be positioned proximate a dock. LNG may be transferred from the LNG carrier to the regasification vessel. Onboard the regasification vessel the LNG may be vaporized to natural gas. The natural gas may be allowed to transfer onshore. As only the regasification vessel docks, such embodiments may reduce the amount of space and capital utilized at the dock.

Figure 7:
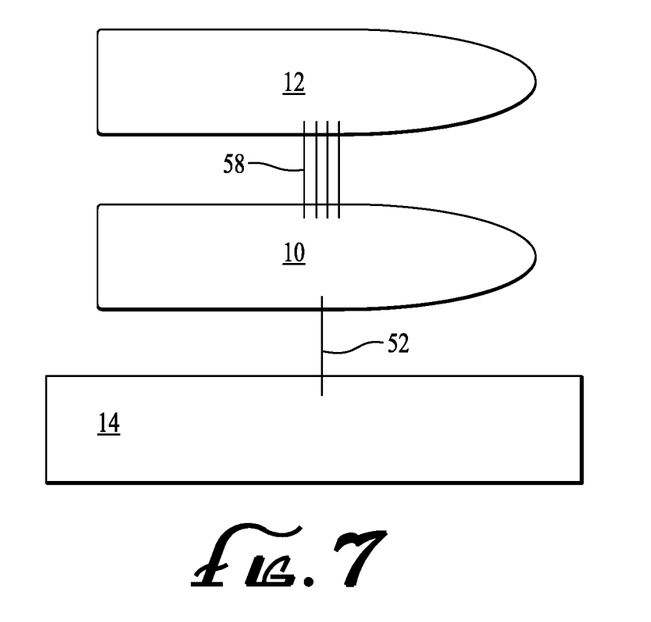
FIG. 7 is a schematic of an embodiment of a system to provide regasified natural gas to onshore facilities using side-by-side transfer of liquefied natural gas.

FIG. 7 is a schematic of an embodiment of a system to provide regasified natural gas to onshore facilities using dockside side-by-side transfer of liquefied natural gas. LNG carrier 12 may be positioned proximate regasification vessel 10. As shown, LNG carrier 12 may be positioned alongside regasification vessel 10. In some embodiments, LNG carrier 12 may be positioned aft of regasification vessel 10. It certain embodiments, LNG carrier 12 may be positioned at the stern of regasification vessel 10.

Regasification vessel 10 and LNG carrier 12 may be coupled using techniques known to those in the art to facilitate ship-to-ship transfer of LNG. For example, regasification vessel 10 and LNG carrier 12 may be coupled using mooring facilities and fendering equipment. Regasification vessel 10 may be positioned next to dock 14. Regasification vessel 10 may be coupled to dock 14 as described herein. LNG may be transferred from LNG carrier 12 to regasification vessel 10 via flexible or rigid connections 58. Connections 58 may be flexible or rigid, and may comprise using flexible cryogenic hoses, hose saddles, emergency quick release couplings and/or emergency shut down and emergency release systems. In some embodiments, connections 58 may be the manifold system 60 described in FIG. 8. Boil-off gas may be managed by ship-to-ship transfer. The transferred LNG may be treated onboard the regasification vessel to form regasified natural gas. The regasified natural gas may be transferred to dock 14 via gas conduit 52. As previously described for FIG. 1, gas conduit 52 may be coupled to onshore facilities.

FIG. 6 is a schematic of an embodiment of a manifold system for ship-to-ship transfer of LNG. Manifold system 60 may allow transfer of LNG from LNG carrier 12 to regasification vessel 10 in a safe and efficient manner. Although shown for ship-to-ship transfer, one or more of manifold systems 60 may be used for ship-to-dock or dock-to-ship transfer. For example, manifold system 60 may be used for the combination of dock manifold 56 and liquid connections 54 described in FIG. 1 and/or FIGS. 6A, 6B and 6C.

Figure 8:
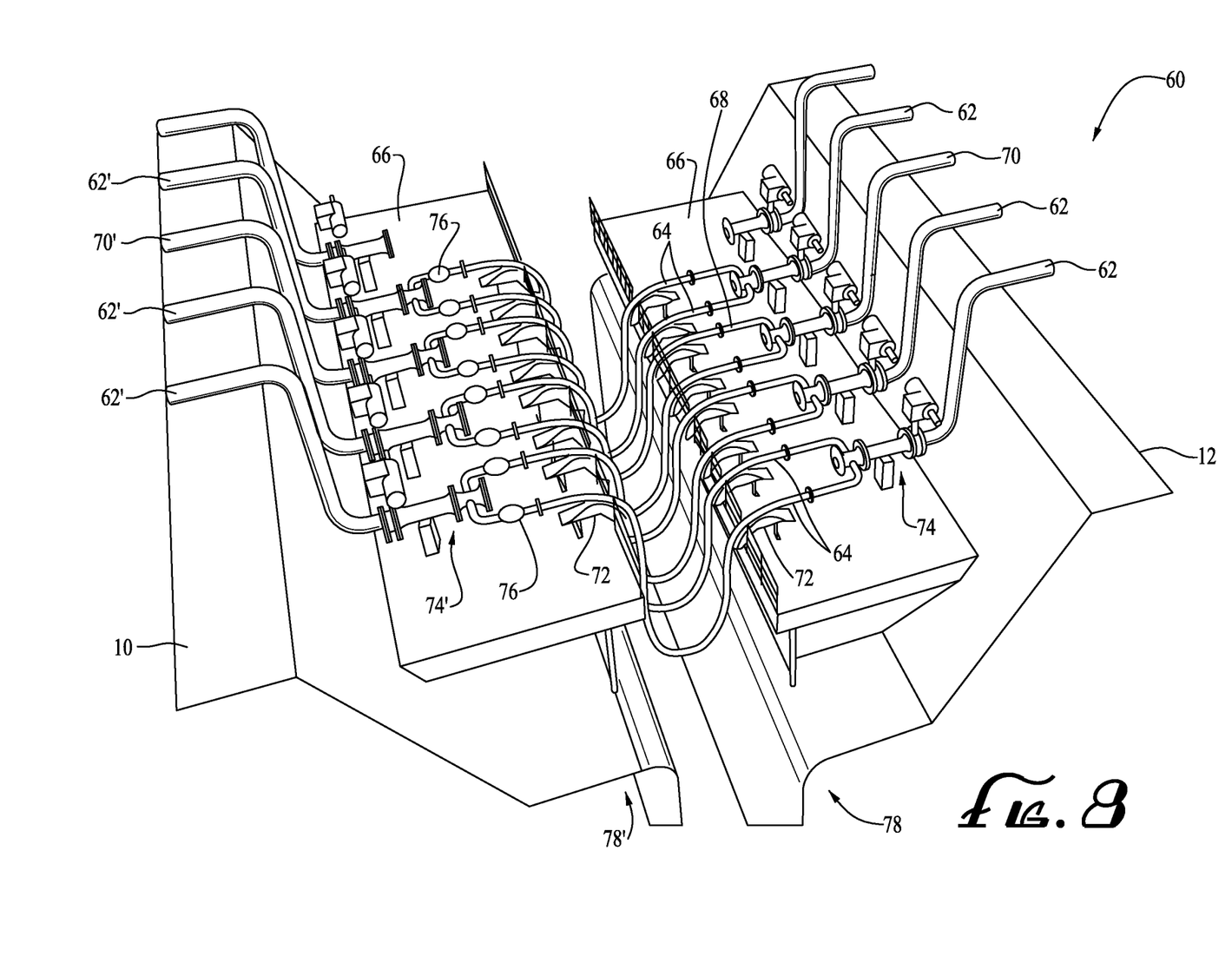
FIG. 8 is a schematic of an embodiment of a manifold configuration system for ship-to-ship transfer of LNG.

As shown in FIG. 8, LNG may flow from an LNG storage tank on LNG carrier 12 through liquid conduits 62. Liquid conduits 62 may be coupled to liquid hoses 64. The LNG may be transferred from liquid conduits 62 to liquid hoses 64 and flows to regasification vessel 10 via liquid conduit 62'. Deck 66 supports liquid hoses 64 and vapor hoses 68. Vapor hoses 68 may be coupled to vapor conduits 70 and 70'. Vapor conduits 70 and 70' and vapor hoses 68 help manage boil-off gas generated as LNG may be transferred through liquid conduits 62.

Liquid hoses 64 may contain stainless steel end fittings, be epoxy filled and swaged, and type approved by class for ship-to-ship transfer of LNG. Liquid hoses 64 may also contain layers of polyethylene and be configured to withstand cryogenic cycles and to leak before failure. In some embodiments, liquid hoses 64 may be composite hoses of 8 inches in diameter, 15 meters in length, and have a 0.65 bend radius. Liquid hoses 64 may be supported by saddles 72 on each of vessels 10 and 12.

Liquid hoses 64 and vapor hoses 68 may be positioned in saddles 72. Saddles 72 may provide protection and support for liquid hoses 64 and vapor hoses 68 and maintain the bend radius of the hoses. In addition, saddles 72 may transfer loads from liquid hoses 64 and vapor hoses 68 to the manifold deck on vessels 10 and 12 and provide chafe protection for the hoses.

Liquid hoses 64 may connect to liquid conduits 62, 62' using spool pieces 74, 74'. In addition, vapor hoses 68 may connect to vapor conduits 70, 70' using spool pieces 74, 74'. Spool pieces 74, 74' may reduce the diameter of the pipe to match the diameter of the hose connections as compared connections made using conventional pipe and hose connectors. For example, using spool pieces 74 liquid hoses 64 may be connected to liquid conduits 62, 62' and/or vapor hoses 68 may be connected to vapor conduits 70, 70' at angles less than 45 degrees. Using spool pieces 74, 74' may allow an increased number of hoses and/or conduits to be used in manifold system 60 as compared to conventional LNG manifold systems.

Release couplings 76 may be positioned between liquid hoses 64 and saddle spool pieces 74' and/or between vapor hoses 68 and saddle spool pieces 74'. Release couplings 76 may allow for liquid hoses 64 and/or vapor hoses 68 to quickly disconnect in emergency situations. In some embodiments, release couplings 76 may be ERC 350. Release couplings 76 may be operated remotely and/or automatically, for example as described in FIGS. 3 and 4, and provide for a dry break on occurrence of a LNG leak. In some embodiments, a hydraulic system may be used to detect and trigger a separation. In some embodiments, the radio communication and pneumatic actuation system shown in FIG. 4 may be used to detect and trigger a separation. In certain embodiments, release couplings 76 may be quick release system 340 and/or ERC 350.

Manifold system 60 may include water bath systems 78, 78'. Water bath system 78 may protect trunk decks and cargo tanks of vessels 10 and 12 from accidental release of LNG. Water bath systems 78, 78' may include a water bath on the main deck of the vessels under the manifold area and an additional water curtain under each manifold.

Systems and methods for dockside ship-to-ship transfer of LNG and continuous shipboard regasification have been disclosed which allow for mobile regasification facilities that operate in a more protected location than prior methods and systems and may therefore be less susceptible to weather disruptions. This method and system costs less than known systems and methods because fewer land-based and subsea infrastructures may be needed and less permitting may be required. In addition, the methods and systems disclosed may be implemented in a shorter period of time than present systems and methods. For example, some locations utilizing an embodiment of the disclosed invention may be brought into service within as little as 12 months of site selection and at a cost of about 10% of a conventional land-based LNG terminal with the same capabilities or may replace conventional LNG facilities in less than seven months. Methods and systems have been described which may be re-implemented more quickly than conventional methods and systems if the systems are damaged. The disclosed systems and methods expand the availability of potential LNG receiving locations and such systems are unexpectedly safe while operating closer to shore than conventional offshore methods.

In this patent, certain U.S. patents and U.S. patent applications have been incorporated by reference. The text of such U.S. patents and U.S. patent applications may be, however, only incorporated by reference to the extent that no conflict exists between such text and the other statements and drawings set forth herein. In the event of such conflict, then any such conflicting text in such incorporated by reference U.S. patents and U.S. patent applications, may be specifically not incorporated by reference in this patent.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims. In addition, it is to be understood that features described herein independently may, in certain embodiments, be combined.

What is claimed is:

1. A method for dockside vessel regasification of liquefied natural gas (LNG), the method comprising:
    transferring LNG from a LNG carrier to a mooring dock, wherein the LNG carrier is moored at the mooring dock;
    managing boil-off gas generated as the LNG is transferred from the LNG carrier to the mooring dock;
    transferring the LNG from the mooring dock to a regasification vessel;
    regasifying the LNG into regasified natural gas onboard the regasification vessel; and
    delivering the regasified natural gas to a receiving dock using a jointed arm configured to transfer natural gas to a natural gas pipeline on the receiving dock.

2. The method of claim 1, wherein the LNG is transferred from the mooring dock to a cargo tank on the regasification vessel.

3. The method of claim 1, wherein the LNG carrier is located on a first side of the mooring dock, and the regasification vessel is located on a second side of the mooring dock.

4. The method of claim 1, wherein the LNG carrier is located on a first side of the mooring dock, wherein the regasification vessel is located on a second side of the mooring dock, wherein the regasification vessel is rotationally coupled to the jointed arm, and wherein the jointed arm is located on the receiving dock.

5. The method of claim 1, wherein the LNG carrier is located on the same side of the mooring dock as the regasification vessel.

6. The method of claim 1, wherein the LNG is transferred from the LNG carrier to the mooring dock, and then to the regasification vessel, in an uninterrupted flow.

7. The method of claim 1, wherein transferring LNG from the LNG carrier comprises transferring LNG through a manifold system comprising liquid hoses and liquid conduits that extend along the mooring dock.

8. The method of claim 1, wherein the mooring dock is the same dock as the receiving dock.

9. The method of claim 1, where in the mooring dock is adjacent to the receiving dock.

10. A system for dockside vessel regasification of liquefied natural gas (LNG), the system comprising:
    a LNG carrier comprising LNG;
    a mooring dock, wherein the mooring dock receives the LNG from the LNG carrier;
    a manifold system coupled between the LNG carrier and the mooring dock, the manifold system comprising:
        a plurality of liquid conduits;
        at least one vapor hose that manages boil-off gas generated as the LNG is transferred through the plurality of liquid conduits; and
        a plurality of dry break release couplings coupled to the plurality of liquid conduits and the at least one vapor hose;
    a regasification vessel, wherein the regasification vessel receives LNG from the mooring dock, and wherein the regasification vessel further comprises a LNG regasification system; and
    a jointed arm, wherein a first coupled end of the jointed arm is rotationally coupled to the regasification vessel and a second coupled end of the jointed arm is coupled to a receiving dock, and the jointed arm accepts regasified natural gas from the regasification vessel and delivers the regasified natural gas to the receiving dock.

11. The system of claim 10, wherein the jointed arm is coupled to a natural gas pipeline on the receiving dock and delivers natural gas into the natural gas pipeline.

12. The system of claim 10, wherein the mooring dock is the same dock as the receiving dock.

13. The system of claim 10, wherein the mooring dock is adjacent to the receiving dock.

14. The system of claim 10, wherein the jointed arm comprises a quick release system and the regasification vessel comprises an emergency release coupling.

15. A system for dockside vessel regasification of liquefied natural gas (LNG), the system comprising:
    a LNG carrier comprising LNG;
    a regasification vessel, wherein the regasification vessel receives LNG from the LNG carrier, and wherein the regasification vessel further comprises a LNG regasification system;
    a manifold system coupled between the LNG carrier and the regasification vessel, the manifold system comprising:
        a plurality of liquid hoses; and
        at least one vapor hose that manages boil-off gas generated as LNG is transferred through the plurality of liquid hoses; and
    a jointed arm, wherein a first coupled end of the jointed arm is coupled to the regasification vessel and a second coupled end of the jointed arm is coupled to a dock, and wherein the jointed arm accepts regasified natural gas from the regasification vessel and delivers the regasified natural gas to a pipeline on the dock.

16. The system of claim 15, wherein transponders detect motion of the regasification vessel.

17. The system of claim 15, wherein the regasification vessel comprises an emergency release coupling, and the emergency release coupling comprises a radio communication system and a pneumatic actuation system.

\* \* \* \* \*